(12) United States Patent
Björk et al.

(10) Patent No.: US 10,435,220 B2
(45) Date of Patent: Oct. 8, 2019

(54) PACKAGING MATERIAL AND PACKAGING CONTAINER HAVING AN OPENING DEVICE MADE THEREFROM

(71) Applicant: TETRA LAVAL HOLDINGS & FINANCE S.A., Pully (CH)

(72) Inventors: Jonas Björk, Lund (SE); Pärm Andersson, Lund (SE); Bengt Håkansson, Sjöbo (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 426 days.

(21) Appl. No.: 15/109,295

(22) PCT Filed: Dec. 22, 2014

(86) PCT No.: PCT/EP2014/079030
§ 371 (c)(1),
(2) Date: Jun. 30, 2016

(87) PCT Pub. No.: WO2015/101540
PCT Pub. Date: Jul. 9, 2015

(65) Prior Publication Data
US 2016/0325902 A1    Nov. 10, 2016

(30) Foreign Application Priority Data
Dec. 30, 2013 (EP) .................... 13199808

(51) Int. Cl.
*B65D 75/58* (2006.01)
*B32B 15/085* (2006.01)
(Continued)

(52) U.S. Cl.
CPC ............ *B65D 75/5838* (2013.01); *B32B 1/02* (2013.01); *B32B 3/266* (2013.01); *B32B 7/12* (2013.01);
(Continued)

(58) Field of Classification Search
CPC .... B65D 75/5838; B65D 5/701; B65D 65/40; B65D 85/72; B32B 1/02; B32B 7/12;
(Continued)

(56) References Cited

U.S. PATENT DOCUMENTS 3,797,628 A 3/1974 Fougere et al.
4,667,093 A 5/1987 MacDonald
(Continued)

FOREIGN PATENT DOCUMENTS

CH 532296 A 12/1972
CN 1125756 A 7/1996
(Continued)

OTHER PUBLICATIONS

International Search Report (PCT/ISA/210) dated Mar. 12, 2015, by the European Patent Office as the International Searching Authority for International Application No. PCT/EP2014/079030.
(Continued)

*Primary Examiner* — Andrew M Tecco
*Assistant Examiner* — Amelia Jae-Ippel Vorce
(74) *Attorney, Agent, or Firm* — Knobbe, Martens, Olson & Bear, LLP

(57) ABSTRACT

Described herein are packaging materials and their use in manufacturing packaging containers having an opening device, and intended for food products. In some embodiments, a packaging material for a packaging container for liquid or semi-liquid food includes: a bulk layer made of paper or paperboard; a heat-sealing layer; a barrier layer arranged between the bulk layer and the heat-sealing layer; and a laminate layer arranged between the barrier layer and the bulk layer. The packaging material can include one or more weakenings in direct or indirect contact with an attenuation in the packaging material, the one or more weakenings defining a consumer opening area. The attenu-
(Continued)

ation can provide a material bridge for an injection molded opening device. In one embodiment, the attenuation can include the heat-sealing layer, the barrier layer, and the laminate layer, but not the bulk layer.

17 Claims, 7 Drawing Sheets

(51) Int. Cl.
| | |
|---|---|
| B32B 27/10 | (2006.01) |
| B32B 27/32 | (2006.01) |
| B32B 3/26 | (2006.01) |
| B32B 7/12 | (2006.01) |
| B65D 65/40 | (2006.01) |
| B65D 85/72 | (2006.01) |
| B65D 5/70 | (2006.01) |
| B32B 29/00 | (2006.01) |
| B32B 1/02 | (2006.01) |
| B32B 27/08 | (2006.01) |
| B32B 27/30 | (2006.01) |
| B65B 3/02 | (2006.01) |
| B65B 3/04 | (2006.01) |
| B65B 7/16 | (2006.01) |
| B65B 61/18 | (2006.01) |

(52) U.S. Cl.
CPC ............ *B32B 15/085* (2013.01); *B32B 27/08* (2013.01); *B32B 27/10* (2013.01); *B32B 27/308* (2013.01); *B32B 27/32* (2013.01); *B32B 29/002* (2013.01); *B65B 3/022* (2013.01); *B65B 3/04* (2013.01); *B65B 7/16* (2013.01); *B65B 61/18* (2013.01); *B65D 5/701* (2013.01); *B65D 65/40* (2013.01); *B65D 85/72* (2013.01); *B32B 2307/31* (2013.01); *B32B 2307/7244* (2013.01); *B32B 2439/62* (2013.01); *B32B 2439/70* (2013.01)

(58) Field of Classification Search
CPC ....... B32B 15/085; B32B 27/08; B32B 27/10; B32B 27/308; B32B 27/32; B32B 29/002; B32B 2307/31; B32B 2307/7244; B32B 2439/62; B32B 2439/70; B65B 3/022; B65B 3/04; B65B 7/16; B65B 61/18; B29C 45/14
USPC ........................................................ 425/116
See application file for complete search history.

(56) References Cited

U.S. PATENT DOCUMENTS

| | | | | |
|---|---|---|---|---|
| 4,725,213 A | * | 2/1988 | Reil ................. | B29C 45/14 425/117 |
| 4,828,138 A | * | 5/1989 | Andersson ............... | B65D 5/70 220/270 |
| 5,029,752 A | * | 7/1991 | Andersson ............. | B65D 5/701 229/160.2 |
| 5,128,196 A | | 7/1992 | Luetkens, Jr. et al. | |
| 5,372,300 A | * | 12/1994 | Nedstedt ............ | B29C 33/0016 229/125.15 |
| 5,381,935 A | * | 1/1995 | Mock .................. | B29C 45/0017 222/541.5 |
| 5,413,238 A | * | 5/1995 | Mock .................. | B29C 45/0017 220/268 |
| 6,436,547 B1 | * | 8/2002 | Toft ........................ | B32B 27/08 156/244.23 |
| 6,454,161 B1 | * | 9/2002 | Rendina ................. | B65D 5/746 220/255.1 |
| 6,534,132 B1 | * | 3/2003 | Lasson ................... | B41M 1/305 422/28 |
| 6,845,902 B1 | * | 1/2005 | Bomer ................... | B65D 5/749 220/258.3 |
| 6,938,819 B2 | * | 9/2005 | Bergerioux ............ | B65D 5/727 220/258.2 |
| 6,974,612 B1 | * | 12/2005 | Frisk ....................... | B32B 27/10 428/34.2 |
| 7,934,637 B2 | * | 5/2011 | Kaneko .................. | B65D 5/064 222/81 |
| 8,007,882 B2 | * | 8/2011 | Toft ........................ | B32B 3/266 428/34.1 |
| 8,616,400 B2 | * | 12/2013 | Persson ............... | B29C 45/0081 220/269 |
| 2004/0026421 A1 | * | 2/2004 | Holm ..................... | B65D 15/08 220/270 |
| 2004/0108371 A1 | * | 6/2004 | Damkjaer .............. | B65D 5/746 229/125.04 |
| 2005/0175800 A1 | | 8/2005 | Staffetti et al. | |
| 2005/0224528 A1 | * | 10/2005 | Berger ..................... | B29C 45/14 222/556 |
| 2007/0262487 A1 | * | 11/2007 | O'Hagan ............... | B29C 51/082 264/241 |
| 2012/0103856 A1 | * | 5/2012 | Toft ........................ | B32B 3/266 206/524.2 |
| 2012/0228339 A1 | * | 9/2012 | Kaneko ..................... | B65B 9/20 222/566 |
| 2013/0273214 A1 | | 10/2013 | Martini et al. | |

FOREIGN PATENT DOCUMENTS

| | | |
|---|---|---|
| CN | 1337914 A | 2/2002 |
| DE | 102011055538 A1 | 5/2013 |
| EP | 0 117 125 A2 | 8/1984 |
| EP | 1164085 A1 | 12/2001 |
| EP | 2107533 A2 | 10/2009 |
| JP | 2010-076835 A | 4/2010 |
| JP | 2013-520330 A | 6/2013 |
| RU | 2230694 C2 | 6/2004 |
| WO | WO 1986/06246 A2 | 11/1986 |
| WO | WO 03/095199 A1 | 11/2003 |
| WO | WO 2009/000927 A1 | 12/2008 |
| WO | WO 2011/104287 A1 | 9/2011 |

OTHER PUBLICATIONS

Written Opinion (PCT/ISA/237) dated Mar. 12, 2015, by the European Patent Office as the International Searching Authority for International Application No. PCT/EP2014/079030.
Office Action received in Japanese Application No. 2016-543646 dated Nov. 6, 2018, in 5 pages.

* cited by examiner

PACKAGING MATERIAL AND PACKAGING CONTAINER HAVING AN OPENING DEVICE MADE THEREFROM

TECHNICAL FIELD

Described herein are packaging materials for packaging containers for liquid or semi-liquid food, its method of production and use thereof. The packaging container having an opening device.

BACKGROUND

Packaging containers of the single use disposable type for liquid foods are often produced from a packaging material based on paperboard or carton. One such commonly occurring packaging container is marketed under the trademark Tetra Brik® Aseptic and is principally employed for aseptic packaging of liquid foods such as milk, fruit juices etc, marketed and sold for long term ambient storage. The packaging material in this known packaging container is typically a laminate comprising a bulk layer of paper or paperboard and outer, liquid-tight layers of thermoplastics. In order to render the packaging container gas-tight, in particular oxygen gas-tight, for example for the purpose of aseptic packaging such as packaging of milk or fruit juice, the laminate in these packaging containers normally comprises at least one additional such gas barrier layer, most commonly an aluminium foil.

On the inside of the laminate, i.e. the side intended to face the filled food contents of a container produced from the laminate, there is an innermost layer, applied onto the aluminium foil, which innermost, inside layer may be composed of one or several part layers, comprising heat-sealable adhesive polymers and/or heat-sealable polyolefins. Also on the outside of the paper or paperboard bulk layer, there is an outermost heat-sealable polymer layer (decor layer). The heat-sealable polymer layers are often based on low density polyethylene or blends thereof.

The packaging containers are generally produced by means of modern, high-speed packaging machines of the type that continuously form, fill and seal packages from a web or from prefabricated blanks of packaging material, e.g. Tetra Brik® Aseptic-type packaging machines. Packaging containers may thus be produced by the so-called form-fill-seal technology basically including continuous reforming a web of the laminated packaging material by means of a filling machine which forms, fills and seals the web into packages.

An aspect of the Tetra Brik®-type packaging method is, as stated above, the possibility of continuous high-speed packaging, which has considerable impact on cost efficiency. Typically many thousands of packages may be prepared per hour. For example the Tetra Pak® A3/speed may manufacture about 15 000 packages per hour (family-size packaging containers of 0.9 liters and above), and about 24 000 packaging containers per hour (portion packages).

Commonly the packaging container have an opening device in order to facilitate consumer opening, many different types of opening devices including pull-tabs or moulded opening devices, as for example discussed in WO03/095199 and WO/2009/000927.

Objects

One object is to manufacture a packaging material and packaging containers for liquid and semi-liquid food manufactured from the packaging material, said containers having a moulded opening device.

One object is to manufacture a packaging material suitable for producing packaging containers for liquid and semi-liquid food wherein the packaging container has a moulded opening device having a high efficiency in regard of the amount of material used and the time needed for production of the opening device.

The above and other objects are achieved by a packaging material for a packaging container for liquid or semi-liquid food, comprising a bulk layer, which on one side has a heat-sealing layer, and wherein the packaging material comprises one or more weakening(s) in direct or indirect contact with an attenuation or a hole in the packaging material.

The above and other objects are achieved by a method of manufacturing a packaging container by providing a packaging material as described herein, arranging, on one side of the packaging material, a first mould portion comprising at least a first mould cavity, arranging a second mould portion comprising at least a second mould cavity on the opposite side of the first mould portion and on the opposite side of the packaging material, wherein the first mould cavity at least partly overlaps the second mould cavity, injecting a plastic melt into at least one of the mould cavities, allowing the plastic melt to come through the packaging material in an overlapping area in order to form a material bridge, allowing the plastic melt to flow into at least the opposite mould cavity and subsequently removing the first and the second mould portions, obtaining a packaging material comprising an opening device, forming the packaging material comprising the opening device to a desired shape, filling and sealing the formed packaging material with a liquid or semi-liquid food product, and obtaining a packaging container having an opening device.

The above and other objects are achieved by a packaging container comprising a packaging material laminate and a plastic opening device and a consumer opening area and wherein the plastic opening device comprises a first portion on the outside of the packaging container connected via a material bridge to a second portion on the inside of the packaging container, the packaging material laminate extending within the consumer opening area such that it is ruptured on using the opening device to open the consumer opening area.

DETAILED DESCRIPTION OF THE EMBODIMENTS

Described herein are aspects relating to a packaging material which in detail is discussed and exemplified herein. Some aspects are also related to a method of preparing the packaging material. Additionally some aspects are relating to the use of the packaging material in providing packaging containers suitable for liquid and semi-liquid food products. The packaging material is in one aspect used in a filling machine, for example of the form-fill-seal type, such as Tetra Pak® A3 filling machine, for manufacture of aseptic packaging containers. In some aspects the packaging containers are manufactured from a roll-fed web of packaging material. In some aspects the packaging containers are manufactured from a blank of packaging material. One aspect relates to a method of manufacturing an opening device, comprises the steps of arranging a first mould portion comprising at least a first mould cavity on one side of the packaging material described in aspects and embodiments herein, arranging a second mould portion comprising at least a second mould cavity on an opposing side of the packaging material, wherein the first mould cavity partly overlaps the second mould cavity in one or more overlapping areas and, injecting a melt, such as a plastic melt into at least one of the mould cavities, wherein the melt comes through the packaging material in an overlapping area forming a material bridge, allowing the plastic melt to flow into at least the opposite mould cavity and removing the first and the second mould portions, and obtaining a packaging material comprising an opening device, forming the packaging material to a desired shape, for example a continuous tube or a sheet of packaging material, followed by, filling and sealing the formed packaging material with a liquid or semi-liquid food product, and obtaining a packaging container having an opening device. In some embodiments the first mould portion and the second mould portions contain one first and one second mould cavity respectively. It is speculated that the plastic comes through the packaging material at least partly due to the pressure built up in the cavity in which the plastic melt is provided. In some embodiments the material bridge is at least partly formed in the attenuation or hole. In some embodiments the material bridge is completely formed in the attenuation or hole. In some embodiments the plastic melt covers at least part of the attenuation. In some embodiments the plastic melt comes through the material without covering the attenuation, i.e. only bridging the tab section and the plastic part, i.e. which is forming the moulded part on the inside of the packaging container. It is also in the attenuation where the plastic melt more easily will be able to come through, i.e. penetrate, the packaging material.

The opening device disclosed herein can mechanically connect one side of the packaging material (e.g. the side which in the packaging container will be in food contact) with the opposite side of the packaging material (e.g. that will become the outside of the packaging container). The opening device can when arranged in the ways described herein exert a force on the packaging material, for example a pulling force applied to the opening device on the outside of the packaging container can be transferred to a force applied to the inside of the packaging container causing the packaging material to rupture. Rupturing the packaging container in a controlled manner is a benefit using an opening device as described herein. Whenever a consumer is rupturing the packaging container using the opening device a consumer opening area is formed. In some aspects the well-defined opening area of the packaging container is obtained by exerting a force onto substantially all the layers of the packaging material instead of applying a pulling force on the top layer alone, i.e. as when an opening device would be glued onto the outside of the packaging container. Exerting a force being directed to substantially all the layers of the packaging material reduces the risk of delamination, e.g. the decor layer being released from one or more of the other layers.

As the plastic melt comes through the packaging material in the overlapping areas the melt may cover exposed portions of the packaging material, e.g. in case of the barrier layer being aluminium foil and having its surface exposed it may beneficially be covered. It may also be welded to an innermost layer of the material. This results in several beneficial features. The innermost layer, i.e. in food contact in case of a filled packaging container, will be formed from a continuous layer, which will reduce the risk of leakage (into the container or out of the container). Also, covering the exposed portions of e.g. the bulk layer of the packaging material, will reduce the risk of the bulk layer, (in case of a paper or paperboard layer) absorbing moisture, which could jeopardize the integrity of the packaging container and thus the quality of the food product contained therein. In some embodiments the opening device is provided, on the outside of the packaging container, as a consumers tab section without covering the complete attenuation, i.e. as previously explained it is going through the attenuation connecting to the part on the inside of the packaging container via a material bridge. In some embodiments the aluminium foil is thus visible in the area of the attenuation, and may or may not be covered by the decor layer.

In some embodiments the possibility of manufacturing an opening device without any excessive components are enabled by the above mentioned method for manufacturing an opening device.

According to one or more embodiments the overlap between the first and second mould cavity may be positioned in accordance to a mark on the packaging material. According to aspects disclosed herein it is not necessary to arrange the mould portions in relation to a hole pattern on or in the packaging material, yet in order to improve the positioning of the mould portions they may still be positioned in accordance with a control mark on the packaging material, an example of a control mark is the attenuation or hole. This may be particularly true in embodiments where the mould portions are to be arranged in register with a weakening of the packaging material. The use of a weakening may render the force exerted on the packaging material when opening the packaging container directed such that a defined consumer opening area is created. Additionally in some embodiments weakening(s) provided in the packaging material can reduce the amount of debris or "flanges" generated during opening, and the weakening(s) are at least partly defining a consumer opening area. The weakening(s) can also improve the visual appearance of the opening area as well as securing that no packaging material end up in the liquid or semi-liquid food product upon opening. The shape and design of the weakening(s) can be as disclosed in the accompanying figures but also many other designs are possible as long as the propagation of a force, applied to the opening device is sufficiently propagated via the weakening(s), to create a consumer opening area. Weakening(s) are embossing, creasing, compression and perforation. In some embodiments the weakening(s) is a perforation.

In one or more embodiments described herein injection of the plastic melt is arranged to come through the packaging material from the innermost layer of the packaging material (which will be the layer in food contact) towards the outer layers thereof. This can conveniently be achieved by injecting plastic melt into the cavity arranged on the inside of the packaging material. Additional injection points may be arranged in the cavity or arranged on the outside of the packaging material. As discussed herein, whenever "outside" and "inside" in connection with a packaging material is used it is supposed to mean that a particular side is to become the inside or outside of the filled packaging container.

Some embodiments herein relate to an opening device manufactured by thermoplastic moulding. A more specific example is injection moulding the opening device by a thermoplastic material such as a polyethylene, polypropylene or another plastic suitable for injection moulding. Such an opening device comprises a first portion on one side of a packaging material and a second portion on an opposite side of the packaging material, the first and second portion being formed in one and the same piece and joined by at least one material bridge extending through the packaging material. In some embodiments the material bridge is a plastic material. In some embodiments the material bridge is a plastic material selected from thermoplastic materials for moulding, such as injection moulding, suitable examples can be polyethylene, polypropylene and polyethylene terephthalate or blends thereof suited for injection moulding. Accordingly such an embodiment enables a force applied on the first portion to be transferred to the second portion of the opening device. In a practical example this will result in a force, e.g. a pulling fore, applied on the first portion on the outside of the packaging material and conveyed to the second portion on the inside of the packaging container. This will generate a force on the packaging material from the inside. The force generated will cause the packaging material to rupture. The type of opening described herein imposes a low risk of delamination (separation of the layers combined in the packaging material).

According to one or more embodiments the opening device may comprise more than one, for example two, material bridges, which increase the number of designs possible for the opening device. Two material bridges, i.e. two positions where the material of the opening device will come through the packaging material offer the possibility to obtain functionally complex solutions as well as visually appealing solutions.

According to one or more embodiments the material bridge and/or adjacent portions thereof may embed exposed edges of the packaging material. While it is beneficial that no fibers (in case of bulk layer of for example paperboard) are being exposed on the inside of the packaging container, and while the present embodiment enables prevention of the exposed fibers from absorbing moisture from the outside, an absolute coverage is additionally beneficial on the outside of the packaging container, and in any case it will improve visual appearance of the opening device.

In one or more embodiments the first portion is divided into different operational portions, comprising for example a tab section and a frame section, both being connected to the second portion via at least one material bridge each. This arrangement provides different operational portions on an outside of the packaging container, without the operational portions having to be directly connected to each other on the outside of the packaging container. The tab section may for example be welded to the outside of the packaging container. In some embodiments parts of the tab section is welded to the outside of the packaging container in order to facilitate transport and storage and yet provide an easy opening of the packaging container by a consumer. Additionally the welding may reduce the risk of damages to the packages and openings during transportation.

Starting with the production, the mould may be opened before the plastic has solidified. Consequently in some embodiments the cycle times are reduced. Opening the mould before the plastic has solidified will however impose a risk of deformation which is why accurate control is important. The increased adhesion will, however, assist in positioning the opening device before the plastic freezes, since a volume thereof will be securely anchored to the packaging material. Another advantage is that the opening device may effectively be welded to the outer layer(s) of the packaging material. This will ensure a proper seal of the packaging container as such, and it will also ensure that the core of the packaging material is encapsulated. Encapsulation is of particular concern when moisture-absorbing fiber-based bulk layers are used, e.g. paper or paperboard. In some aspects the encapsulation is important as the material of the opening device has come through the packaging material.

Typical materials for the opening device are thermoplastic materials suitable for injection moulding. Suitable examples thereof are polyethylene, polypropylene, and polyethylene terephthalate.

Some aspect relate to a packaging material suitable for injection moulding of an opening device as described herein. In some embodiment the opening device is injection moulded in the high-speed packaging machines which imposes that the moulding, e.g. injection moulding must be done quickly and reliably as the packaging material thereafter will be sterilized, for example by hydrogen peroxide or by an electron beam. Subsequently the packaging material will be filled and sealed and as mentioned above many thousands of packages such as 12 000 packages or more per hour are produced. Optionally it may be contemplated that the provision of the moulded opening device is done prior to or subsequent to a filling machine. Accordingly the packaging material must be suited for the type of moulding, e.g. injection moulding. In some embodiments the packaging material comprises at least a decor layer, on one side having a bulk layer (12), such as a paper or paperboard layer, which on the side opposite the decor layer (11) has a barrier layer (14), such as a barrier film or coating or aluminium foil, which on the side opposite the bulk layer has a heat-sealing layer (16), and wherein the packaging material comprises a weakening in contact, directly or indirectly with an attenuation or a hole in the packaging material. The attenuation is for example an opening, a recess or a slit. The attenuation consists of the same materials (e.g. layers) as the rest of the packaging material with the exception of at least one of the layers, for example the bulk layer. In some embodiments a cut-out (i.e. hole) is created in the bulk layer prior to lamination but optionally one or more of the other materials making up the packaging material may be cut simultaneously with the bulk layer (i.e. laminating the layers of the packaging material can be done in more than one operation). In some embodiments the attenuation is a hole covered by the barrier layer and the heat-sealing layer, i.e. not the decor and bulk layer. In some embodiments the attenuation is comprised of the decor layer, barrier layer and the heat-sealing layer, i.e. not the bulk layer. In some embodiments the attenuation is comprised of the bulk, barrier and heat-sealing layer. The attenuation can be seen as a membrane allowing the packaging container to be filled with liquid or semi-liquid food without compromising the packaging container, i.e. its intended performance is maintained and for example the barrier, such as water, vapour and oxygen, is maintained. The attenuation may take any desired shape. Generally the attenuation (as well as the weakening(s)) should not be too close to sealing bands and/or folding lines. The term "indirect" when discussed in connection with embodiments disclosed herein means that the weakening(s), e.g. a perforation, compression, crease or embossing, does not necessarily have to be in direct contact with the attenuation or hole as long as a force applied via the opening device, sufficient to cause the packaging material to rupture, is propagated via the weakening(s) in order to generate a consumer opening area. Thus, the weakening should be positioned sufficiently close to the attenuation, such that a force which is applied to the packaging material at the attenuation via an opening device and which causes the packaging material at the attenuation to break or rupture, is further propagated via the weakening in order to generate a consumer opening area. Generally this means that the weakening at least partly defines the shape of the consumer opening area.

In some embodiments the attenuation is in direct contact with the weakening. Generally the weakening is a change on at least the surface of one of the layers of the packaging material, for example the bulk layer.

The opening device is arranged in the attenuation and in some embodiments covers, at least partly, the attenuation. In embodiments having a hole instead of attenuation naturally the hole is completely covered by the opening device. By arranging the opening device at least partly in the attenuation being connected to the weakening it is possible to manufacture a packaging container, containing a liquid or semi-liquid food product, having an opening device provided by low cost and low amount of material. A force, such as a pulling force, applied for example by a consumer to the opening device causes the packaging container to rupture and the thus created rupture is propagated via the weakening (s) to generate a defined consumer opening area. Accordingly it is possible to create defined opening areas in packaging containers, for example for pouring or for allowing a consumer to drink the liquid or semi-liquid food.

In some embodiments the weakening is a perforation. In some embodiments the attenuation is a punched hole covered at least by the barrier layer and the heat-sealing layer, i.e. not the bulk and decor layer. The attenuation can be considered as membrane and is generally a continuous part of the applicable layers, i.e. which layers for example have been arranged after punching or cutting the hole.

In some embodiments the punched hole covered by the membrane is a hole having a diameter of between 4-15 mm, such as about 5-12 mm, such as about 6-10 mm, such as about 8 mm.

In some embodiments the attenuation is comprised of one or more of the layers making up the packaging material. Accordingly the attenuation can be comprised of one or more layers, for example the heat-sealing layer, the adhesive, the barrier layer, and the laminate layer. This means that the attenuation does not comprise the bulk layer.

In some embodiment the attenuation is comprised of at least the barrier layer and the heat sealing layer. In some embodiments, for example those where the packaging material is used to manufacture aseptic packaging containers the barrier layer is part of the attenuation. In some embodiments also the heat sealing layer is comprised in the attenuation, for example those to embodiments intended for manufacturing of opening devices as described herein on packages of the type which are brick shaped packaging containers, gable top packaging containers, wedged-shape packaging containers, square-, rectangular- or octagonal-based packaging containers having a slanted top. Examples thereof are Tetra Brik®, Tetra Brik® Aseptic, Tetra Brik® Edge, Tetra Gemina® Aseptic, Tetra Prisma® Aseptic, and Tetra Rex®, packages.

In some embodiments the above are combined, i.e. the packaging material comprises the weakening as a perforation and the attenuation is covered by one or more layers of the packaging material, with the exception of at least the bulk layer.

In some embodiments the attenuation or hole should be formed at a distance from the sealing bands; as a matter of fact, an attenuation or hole too close to a sealing band may be damaged during the formation thereof due to heat and pressure applied in order to form the packaging material into a packaging container.

In some embodiments the bulk layer comprises a cut-out and is a paper or paperboard layer.

The following terms and definitions used herein are to be given the definition herein below A "polyolefin" or "polyalkene" is a polymer produced from a simple olefin of the formula $C_2H_{2n}$ as a monomer.

A "polyethylene" is a polyolefin produced by polymerizing the monomer ethylene.

A "copolymer" or "heteropolymer" is a polymer of two or more monomeric species.

A "high density polyethylene" or "HDPE" is an ethylene polymer having a density of more than 0.941 g/cm³.

A "low density polyethylene" or "LDPE" is a polyethylene homopolymer having a density from 0.910 to 0.935 g/cm³. LDPE is also known as branched or heterogeneously branched polyethylene because of the relatively large number of long chain branches extending from the main polymer backbone. LDPE has been commercially manufactured since the 1930s and is well known in the art A "linear low density polyethylene," or "LLDPE" refer to a polyethylene copolymer having a density from 0.89 g/cm³. LLDPE linear and does not substantially contain long chain branching, and generally has a narrower molecular weight distribution than conventional LDPE. The traditional "linear low density polyethylene" (LLDPE) can be produced with conventional Ziegler-Natta catalysts, vanadium catalysts. LLDPE has also been commercially manufactured for a long time (since the 1950s for solution reactors, and since the 1980s for gas phase reactors) and is also well known in the art.

A "mLLDPE" is a linear low density polyethylenes produced by metallocene catalysts in gas phase reactors and/or with metallocene catalysts in slurry reactors and/or with any of the haftocene catalysts in solution reactors. The mLLDPE are well known in the art of packaging technology.

A "blank" means a pre-manufactured, flat folded tubular sheet of a packaging material, such as a packaging material comprising paper or paperboard and liquid tight plastic coatings on each side of the paper or paperboard. The blank is used to manufacture sealed packaging containers by erecting the blank to an open tubular sleeve which is transversally sealed in one end before filling and transversally sealing the open end.

A "thickness" referring to the packaging material, a packaging container, or layers thereof is determined by microscopy, for example by a suitable microscope such as those marketed under the name Olympus, for example BX51.

"Liquid or semi-liquid food" generally refers to food products having a flowing content that optionally may contain pieces of food. Dairy and milk, soy, rice, grains and seed drinks, juice, nectar, still drinks, energy drinks, sport drinks, coffee or tea drinks, coconut water, tea drinks, wine, soups, jalapenos, tomatoes, sauce (such as pasta sauce), beans and olive oil are some example of food products contemplated.

"Aseptic" in connection with a packaging material and packaging container refers to conditions where eliminate, in-activate or kill bacteria, spores and microorganisms are eliminated, in-activated or killed. Generally an aseptic process is used when a product is aseptically packed in a packaging container.

The term "heat-sealing" refers to the process of sealing of a thermoplastic material with another. Thus a heat-sealable material should be able to generate a seal when put in contact with another suitable thermoplast under the appropriate conditions such as when applying sufficient heating. Suitable heating can be achieved by induction heating or ultrasonic heating or other heating means.

The term "weakening" is intended to mean a material compression, creasing, perforation or embossing.

The term "attenuation" means a portion of the packaging material comprising at least one, but not all, of the layers of the packaging material. The attenuation can for example be an opening, slit or recess as long as it is covered by at least one of the layers of the packaging material. As one example the attenuation is a continuation of the barrier layer and the heat-sealing innermost layer of the packaging material and the bulk layer has been cut-out making up the boundaries of the attenuation.

Laminated packaging materials are obtained by various methods for laminating layers together, such as extrusion lamination, dry adhesive lamination, heat-pressure lamination, and may also be including various coating methods. Although to achieve the benefits the particular lamination technique is not crucial it is considered to be of particular use in extrusion lamination to produce laminated packaging materials, in particular carton-based packages used for food such as liquid and semi-liquid food.

The term "consumer opening area" means the area of the packaging material, which after opening of the package defines the open part of the package, i.e. is open, and which is seen as the opening by a consumer. In an embodiment of the present invention, the consumer opening area is larger than the opening device itself, and bigger than the area of the packaging material to which the opening device is attached.

Consequently, a packaging container having a long shelf-life is provided, the shelf-life is not less than 3, 6, 8, 9, 10, 11, 12, 13, 14, 15 months. Naturally long shelf-life is preferred. Generally a shelf life of at least 12 months are required, which however may vary upon different preferences. In one aspect a packaging container made from the packaging material described herein has a shelf-life of 12 months.

In particular, such a laminated packaging material comprising bulk layer, such as a paper or paperboard bulk layer is provided. The bulk layer is arranged to provide for the greatest contribution to the flexural rigidity of the laminate. The paper or paperboard used herein has a grammage between 60-480 g/m$^2$, depending on the requirement for different types of packages. The grammage of the paperboard is assessed in accordance ISO 536. Grammage expresses weight per unit area and is measured in g/m$^2$. The paper or paperboard normally has a thickness between 80-660 μm, and is appropriately selected in order to obtain the desired stiffness suitable for the type of packaging container and the intended food product. The bulk layer thickness can be assessed by microscopy as discussed herein below. It is however also conceivable that the bulk layer of the packaging material instead is a polyolefin bulk layer, made e.g. of poly-ethylene, polypropylene or copolymers of ethylene or propylene, such as, for example, ethylene-propylene, ethylene-butene, ethylene-hexene, ethylene-alkyl(meth)acrylate or ethylene-vinyl acetate copolymers, or PET (polyethylene terephthalate) bulk layer. In some embodiments the bulk layer is paper or paperboard.

The bulk layer may be treated or coated in order to improve compatibility between the layers, and to obtain additional desired properties such as improved rigidity. The bulk layer may be of a thickness between 80-660 μm, such as 90-110 μm and 200-500 μm, such as 250-350 μm. Expressed in g/m$^2$ a suitable interval is 67-450 g/m$^2$. The bulk layer may contain coatings such as for example clay coating. In some embodiments the bulk layer is a paper of paperboard layer.

The packaging material in some embodiments comprise a bulk layer of paper or paperboard (i.e. carton) optionally having a decor layer i.e. to be the outer side of the filled and sealed packaging container. The side of the bulk layer, e.g. paper or paperboard, which is to be the outer side of the closed and sealed packaging container can contain a print covered by the decor layer. The decor layer is a polyolefin layer such as the above mentioned outermost heat-sealable polyolefin layer in contact with the surroundings, for example LDPE or polypropylene. The decor layer provides additional protection and stability to the packaging container.

The decor layer is a heat-sealable polyolefin layer(s) facing the surrounding environment of a resulting packaging container, suitable polyolefins are polyethylene of the low density type, selected from the group consisting of LDPE, LLDPE, VLDPE, ULDPE or mLLDPE and blends of two or more thereof, optionally other polyolefins such as high density polyethylene (HDPE), polypropylene or propylene co- or ter-polymers are useful as the layer facing the surroundings. The decor layer may be applied by extrusion coating or other similar techniques such as those disclosed above. Optionally the decor layer may be a pre-made film which is laminated to the bulk layer. Suitable example of a polyethylene to be used as a decor layer is a LDPE of extrusion grade, for example having a LDPE having a melt flow index (as determined in accordance with ASTM D1238, 190° C./2.16 kg) of 4-15, such as 6-9, and a density (as determined in accordance with ISO 1183, method D) of 915-922 kg/m$^3$, such as 918-920 kg/m$^3$ The thickness of decor layer of the packaging material is between 5 μm-50 μm such as 7 μm-30 μm, such as 7 μm-20 μm, such as 8 μm-15 μm.

Opposite the optional decor layer and hence facing the inside of the final packaging container a barrier layer is arrange by help of a laminate layer which could be a polyolefin-based layer or another suitable layer such as a polyolefin, such as a suitable LDPE which facilitates adhesion between the bulk layer and the oxygen barrier. In some embodiments the barrier is an aluminium foil, a barrier film or coating. When an aluminium foil is used a suitable thickness is between 3-15 μm, such as 5-10 μm, such as 5-8 μm. Suitable LDPE grades are for example manufactured by Dow, Exxon Mobile, Borealis, and Ineos etc, such grades are well known to the skilled person. The laminate layer is in an embodiment applied by an extrusion process using commercially available extrusion equipment. Materials, suitable as laminate layer, are known and conventionally comprise a polyolefin. According to one embodiment the laminating material comprises a polyethylene or blends thereof. Within the group of polyethylenes, the properties of laminating layers can be varied and tailored in order to achieve various final properties in a packaging material. Variations of the laminate layer for the desired type of packaging material for liquid and semi-liquid foods are thus found largely within the group of polyethylene polymers. This group thus also includes copolymers of ethylene and other alpha-olefin monomers which of course include, for example, linear low-density polyethylenes, also copolymers of ethylene and propylene in different proportions, for example so-called plastomers or elastomers of the type marketed by Dow under the names "Engage" and "Affinity", and also terpolymers of ethylene, propylene and an alpha-olefin monomer having polyethylene-like properties. Examples of polymers that can help to improve various mechanical properties are what are called linear polymers, such as linear polyolefins, for example high-density polyethylene (HDPE), medium-density polyethylene (MDPE), linear low-density polyethylene (LLDPE/VLDPE/ULDPE) produced with conventional catalysts or with so-called single-site catalysts, or con-strained-geometry catalysts, including so-called metallocene-LLDPE (mLLDPE), and polypropylene (PP). Very low density polyethylene (VLDPE) and ultra low density polyethylene (ULDPE) are examples of subcategories within the category of linear low density polyethylenes. Depending on the type and quantity of comonomer, these polymers generally have greater durability in several respects. Variations of the laminating material for the desired type of packaging material for beverages and liquids are found within the group of polyethylene polymers, for example polymers chosen from the group that includes low-density polyethylene (LDPE), high-density polyethylene (HDPE), medium-density polyethylene (MDPE), linear low-density polyethylene (LLDPE/VLDPE/ULDPE) produced with conventional catalysts or with so-called single-site catalysts, or constrained-geometry catalysts, including so-called metallocene-LLDPE (mLLDPE), and mixtures or blends thereof; and polypropylene or propylene co- or ter-polymers. One example of a suitable laminate layer is a polyethylene, for example LDPE of extrusion grade, for example having a melt flow index (as determined in accordance with ASTM D1238, 190° C./2.16 kg) of 2-13, such as 5-10, and a density (as determined in accordance with ISO 1183, method D) of 914-922 kg/m$^3$, such as 915-920 kg/m$^3$. The thickness of the laminate layer of the packaging material is between 5 μm-50 μm such as 10 μm-30 μm, such as 15 μm-30 μm, such as 17 μm-25 μm.

The barrier layer, such as oxygen barrier (e.g. aluminium foil) is arranged by help of the laminate layer on the side opposite the bulk layer and has an adhesive on the side opposite the laminate layer. The adhesive depends on the type of bulk layer and the barrier layer and are within the capacity of those skilled in the art to select. When the barrier layer is aluminium foil ethylene acid copolymers such as ethylene acrylic acid copolymer, for example marketed under the tradename Primacor® by Dow or Nucrel® by Dupont can suitably be used.

Generally the different layers present in the packaging material are possible to detect for example by microscopy. It may not be possible to separate the adhesive from the heat-sealable layer, and thus in certain embodiments the layer forming the inside of the packaging container is a combination of the adhesive and the heat-sealable layer where the heat-sealable layer is facing the liquid or semi-liquid food product. The adhesive layer of the packaging material as described herein has a thickness between 3 μm-12 μm, such as 4 μm-10 μm such as 5 μm-9 μm. The adhesive layer can be characterized by different methods including for example infrared spectroscopy (IR).

The packaging material contains an innermost heat-sealable layer of a heat-sealable polyolefin polymer which is applied as a layer to be directed towards the inside of the container, i.e. in direct food contact. The heat-sealable layer for the innermost layer may suitably be a polyethylene polymer of the low density type, selected from the group consisting of LDPE, LLDPE, VLDPE, ULDPE or mLLDPE and blends of two or more thereof. The arrangement of the heat-sealable layer is similar to the laminate layer and what was disclosed above in connection with the laminate layer applies also for the innermost layer. Depending on the type of packaging containers produced from the packaging material, also heat-sealable innermost layers of high density polyethylene, polypropylene or propylene co- or ter-polymers are conceivable within the scope of the appending claims as long as they are compatible with and achieve the desired effect in combination with other components of the packaging material and in particular the adhesive as described herein. Suitable examples to be used as innermost layers are blends between LDPE and mLLDPE (e.g. 50/50, 40/60, 60/40, 30/70, 70/30, 20/80, 80/20 weight % blend ratios), such as LDPE of extrusion grade, for example having a melt flow index (as determined in accordance with ASTM D1238, 190° C./2.16 kg) of 2-12, such as 2-7, such as 2-5.5 and a density (as determined in accordance with ISO 1183, method D) of 914-922 kg/m$^3$, such as 915-920 kg/m$^3$. Examples of mLLDPEs suitable for use in aspects and embodiments described herein have a density less than 0.922 kg/cm$^3$ and a melt flow index (MFI) of 15-25 at 190° C. and 2.16 kg (ASTM 1278). Additional details are well known and within the capacity of the skilled person, additional understanding can be obtained for example in U.S. Pat. No. 6,974,612. The thickness of the innermost layer of the packaging material is between 5 μm-50 μm, such as 10 μm-30 μm, such as 15 μm-30 μm, such as 17 μm-25 μm. Naturally, the above referred examples are working as a general guidance and also other possible polymers are possible.

Hence the above mentioned layers of the packaging material are for example applied to the respective side of the bulk material by extrusion coating or film and foil lamination.

According to one possible production method the packaging container is obtained by providing a paperboard having an optional print, and a suitable crease pattern, the paperboard has a cut hole repeated such that a packaging container will possess at least one hole (or attenuation). Additionally the paperboard is provided with the weakening which is in direct or indirect contact with the hole. The above mentioned crease patterns serves as folding lines for forming the final package such as a Tetra Brik® Aseptic (in the shape of a brick). An example of a crease pattern can for example be seen in FIG. 3 of WO2012/163753. The paperboard is fed from a roll and the paper or paperboard web is optionally treated with heat and/or ozone. The laminate layer is arranged by help of a film of the plastic exiting an extruder. Normally the extruded material has a temperature above 260° C., such as above 280° C., such as above 290° C., such as above 300° C. For some materials an extrusion lamination temperature above 290° C. are preferred. In order to further describe the extrusion FIG. 3 discloses a schematic illustration of an extruder (31) suitable for the arrangement of the laminate layer (13) on the paper or paperboard (12), additionally showing a molten plastic film (32) of the polymer to become the laminate layer (13) arranged on a paper or paperboard web (35). The extruder melts and mixes the polymer. In case of blends the extruder may also be used to blend the polymers which are for example supplied via separate hoppers. The molten film (32) and the paperboard are joined in a nip between the rollers (33 and 34). Similarly the other polymer layers (adhesive and heat-sealable innermost layer) are added to a web of paper or paperboard (35), optionally a laminate. The barrier layer (14) may for example be arranged from a separate roll and arranged together with the laminate layer (13), or with an adhesive.

In one embodiment the packaging material described herein, and in the accompanying claims is arranged in a packaging material which comprises a decor layer (11) which on one side of the layer has a paperboard layer (12), said paperboard layer (12), on the side opposite the decor layer (11) has a laminate layer (13), said laminate layer (13), on the side opposite the paperboard layer (12) has an oxygen barrier (14), said oxygen barrier (14), on the side opposite the laminate layer (13) has an adhesive (15), and said adhesive (15), on the side opposite the oxygen barrier (14) has a heat-sealable layer (16). The packaging material comprises a weakening in direct contact with an attenuation consisting of the decor layer, the laminate layer, the adhesive and the heat-sealable layer. The packaging material is in one embodiment transformed into an aseptic packaging container. The transformation may be performed by pre-folding and sealing parts of the packaging material into a blank, example of packages made from blanks are for example Tetra Recart® and gable top containers. The blank will be provided with an opening device as described herein and filled and sealed in a filling machine suitable to handle blanks. The transformation from a packaging material into a packaging container may also be performed using the form-fill-seal technology, for example in a Tetra Pak® A3 Speed/Flex. A packaging container formed from the packaging material according to the aspects and embodiments described herein may be of any known shape. In some aspects the container described herein relates to a substantially brick- or wedge-shaped container that is durable at handling and distribution and resistant to moisture and oxygen gas during long term storage, due to the high quality packaging material, which in turn also provides for sufficient seal quality and gas barrier properties. Further types of paperboard-based packages for liquid packaging where the aspects and embodiments described herein may be useful is a brick shaped packaging container, a gable top packaging container, a wedged-shape packaging container, a square-, rectangular- or octagonal-based packaging container having a slanted top. More specifically the so called, Tetra Brik®, Tetra Brik® Aseptic, Tetra Brik® Edge, Tetra Gemina® Aseptic, Tetra Prisma® Aseptic, and Tetra Rex® packages or other kinds of bottle-like packages comprising a sleeve of the paperboard-based packaging material, a fold-formed bottom thereof, and a top and screw cap of a plastic mould-shaped material. One embodiment described herein relates to a Tetra Brik® packages of a known size such as 200 ml, 250 ml, 500 ml and 1000 ml which optionally may have a squared base, or a slanted top such as for example Tetra Brik® Edge.

Additionally, detailed descriptions of embodiments are disclosed in connection with the description of embodiments.

EXAMPLES

In a specific embodiments packaging containers of the type Tetra Brik® 250 ml where prepared from a packaging material comprising 12 g/m² decor of a LDPE. The decor layer is arranged on the outside of the package. Additional layers starting from the decor layer are: 268 g/m² duplex paperboard, having a punched (for example as shown in FIG. 4a (42)) hole having a diameter of about 8 mm and a perforation; 20 g/m² LDPE as laminate layer; about 6 µm aluminium foil, 6 g/m² adhesive (Primacor™ 3440) and 19 g/m² heat-sealing layer of a blend of a LDPE (30 w %) and a metallocene catalyzed linear, low density polyethylene. All the layers cover the hole forming an attenuation. The packaging material is obtained on a roll which is fed to a Tetra Pak® A3 Speed where it except for the conventional operations and before the sterilization is subjected to a first mould portion and a second mould portion and the LDPE for injection moulding is injected at a temperature of about 200° C. The plastic is allowed to cool for about 300-800 ms before the moulds are being released and the material further processed in accordance with the conventional manufacturing process in order to generate a Tetra Brik® Aseptic packaging container having an injection moulded opening device.

DESCRIPTION OF THE DRAWINGS

Further advantages and favorable characterizing features will be apparent from the following detailed description, with reference to the appended figures, in which.

GENERAL DESCRIPTION OF EMBODIMENTS

Figure 1:
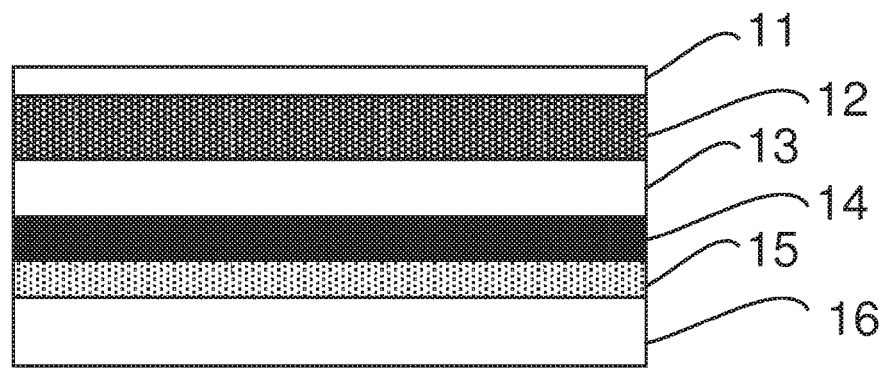
FIG. 1 is a cross-sectional view of a laminated packaging material according to aspects described herein.

FIG. 1 shows a cross-section of a packaging material. The decor layer (11) is a polyolefin such as a suitable LDPE or PP. The decor layer can be used for example to provide a cover a printed pattern, the hole and the weakening (not shown in the figure) on the paper or paperboard layer (12), which layer is arranged on one side of the decor layer (11). The paperboard layer (12), on the side opposite the decor layer, has a laminate layer (13) selected from suitable polyolefins such as LDPE or PP. The laminate layer provides adhesion to the oxygen barrier (14), which is arranged on the opposite side of the paper or paperboard layer (12). The barrier layer (14) provides the desired barrier such as oxygen, light, water and vapour barrier depending on the specific need determined by the product to be packed. The barrier layer can for example be an aluminium foil or a vapour deposited film, such as a metallized or vapour deposition coated, such as PECVD coated film. On the side opposite the laminate layer the adhesive polymer (15) is arranged on the barrier layer. The adhesive (15) may for example be applied by extrusion coating, when the barrier layer is aluminium foil the adhesive could be a suitable adhesive marketed under the tradename Nucrel®. On the side opposite the barrier layer, the adhesive is provided with a heat-sealable layer such as a suitable polyolefin such as PE or PP or blends thereof. The heat-sealable layer is the layer facing the product in the finished packed packaging container. The heat-sealable material can be arranged by extrusion coating, or by a pre-made film through film lamination.

Figure 2:
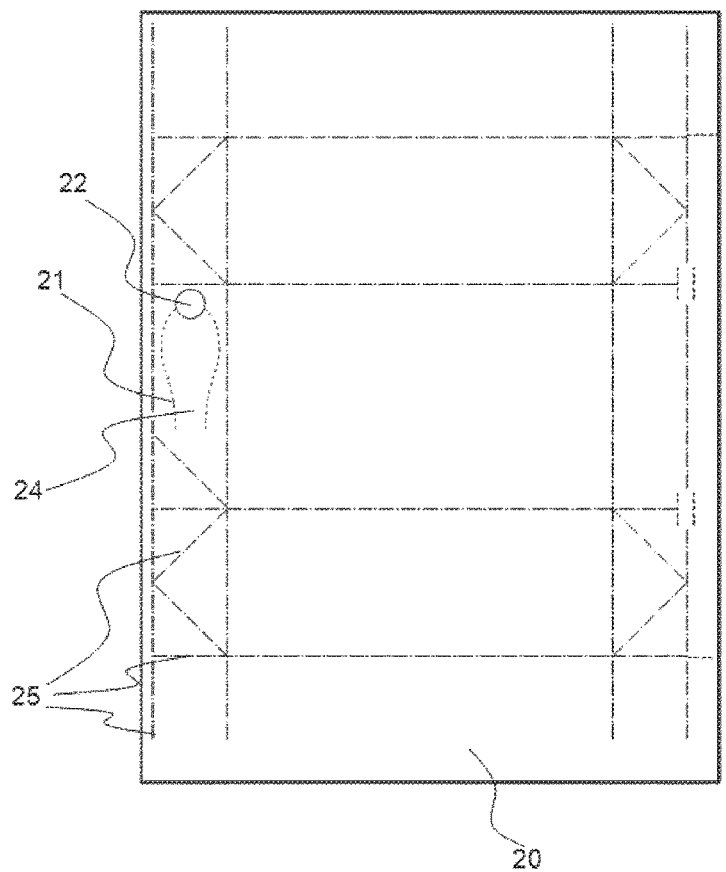
FIG. 2a illustrates a schematic view of part of a packaging material
FIG. 2b illustrates a schematic view of part of a packaging material

FIG. 2a is a schematic illustration of a part of a web of packaging material (20) having a weakening (21) which in the embodiment illustrated is in direct contact with an attenuation or hole (22). The weakening(s) (21) at least partly defines a consumer opening area (24), which for example may be bigger or smaller than the area defined by the weakening(s) (21). FIG. 2a also includes lines (25) which are intended to assist in forming and folding of the packaging container. Examples of such lines are crease lines (25). Each type of packaging container has its specific crease pattern. In some embodiments an attenuation (22) is used in combination with weakening(s) such as a perforation(s) (21). In some embodiments the hole (22) is used in combination with perforation(s) (21).

Figure 2B:
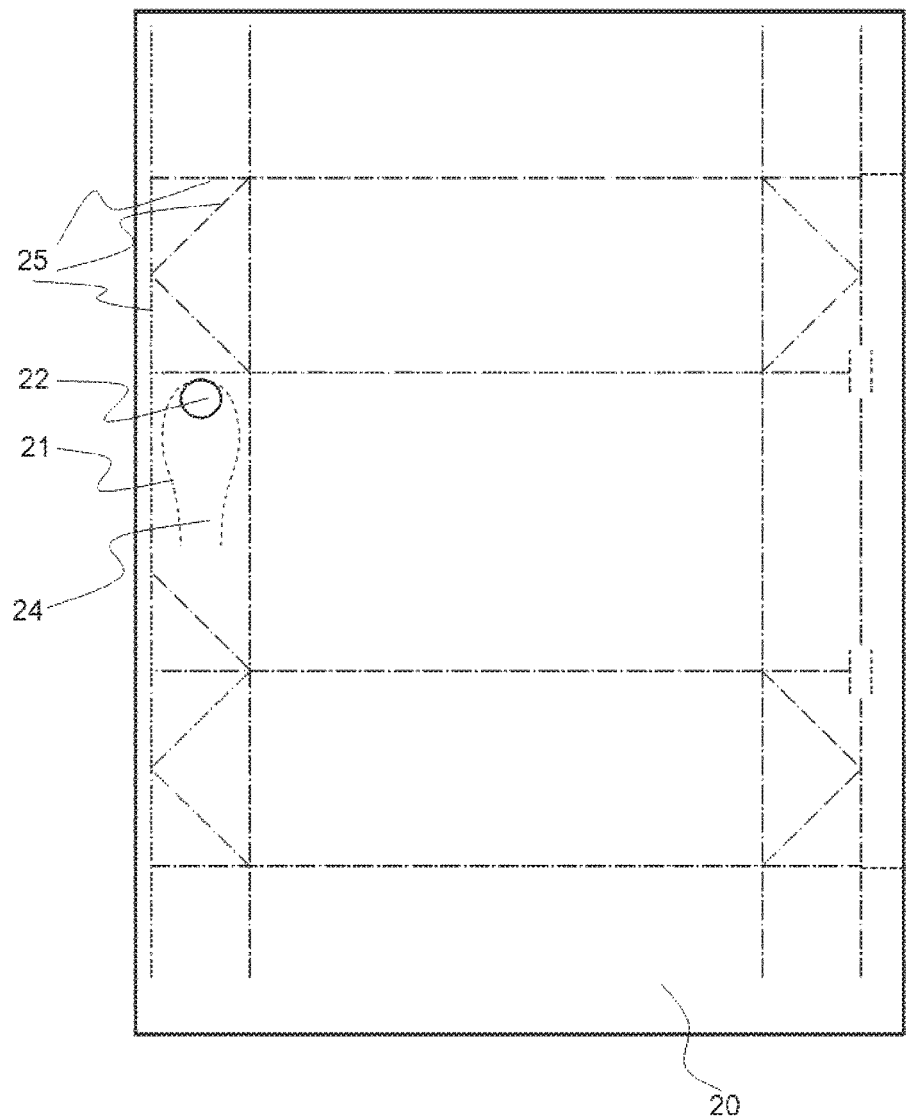

FIG. 2b is a schematic illustration of a part of a web of packaging material (20) having a weakening (21) which in the embodiment illustrated is in direct contact with an attenuation or hole (22). The weakening (s) (21) at least partly defines a consumer opening area (24), which for example may be bigger or smaller than the area defined by the weakening(s) (21). FIG. 2b also includes lines (25) which are intended to assist in forming and folding of the packaging container. Examples of such lines are crease lines (25). In some embodiments an attenuation (22) is used in combination with weakening(s) such as a perforation(s) (21). In some embodiments the hole (22) is used in combination with perforation(s) (21). FIG. 2b illustrates a different arrangement between the attenuation or hole (22) and the weakening(S) (21).

Figure 3:
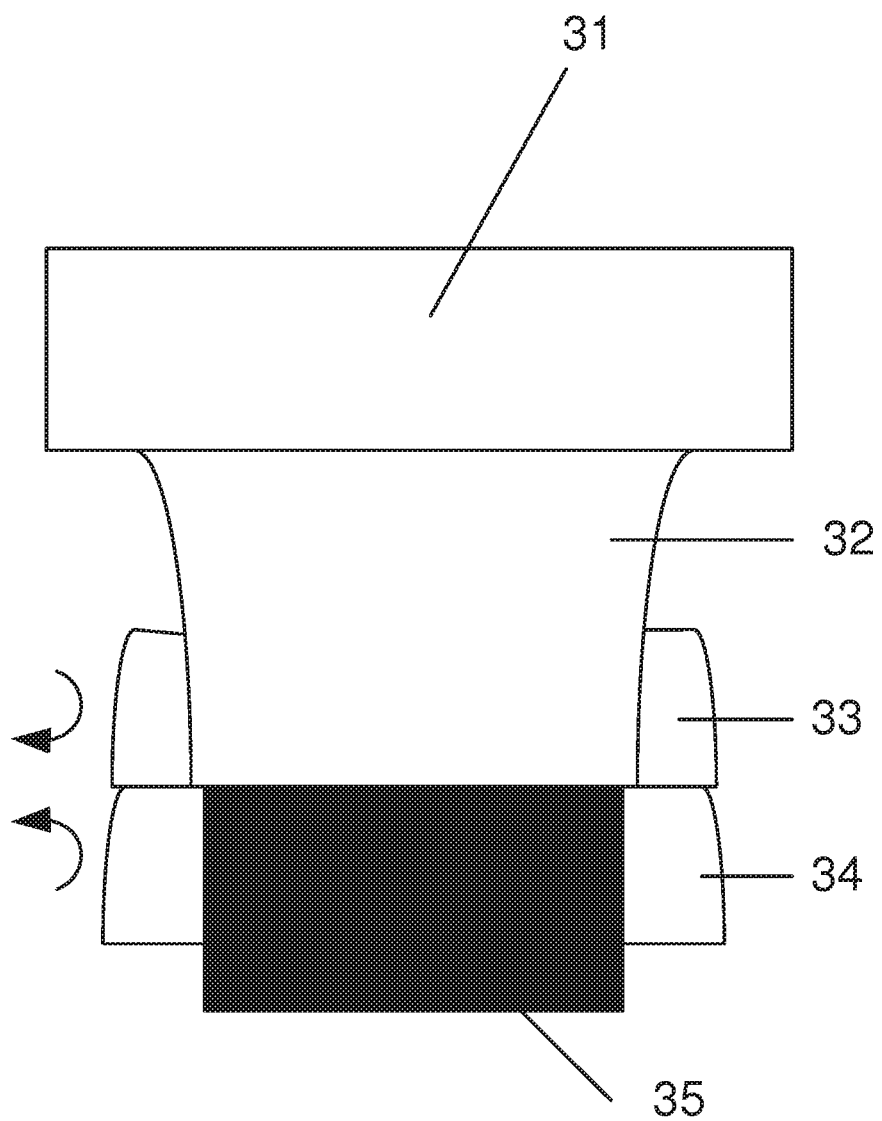
FIG. 3 is a schematic drawing of an extruder, the extruded film, a paper or packaging material web and the rollers arrange to join the plastic and the paper or paperboard.

FIG. 3 is a schematic illustration of an extruder (31). An extruder of the schematically illustration is suitable for application of the, decor layer (11), laminate layer (13), adhesive (15) and the heat-sealable layer (16). As an example the laminate layer (13) can be on the paper or paperboard (12), additionally showing a molten plastic film (32) of the polymer to become the laminate layer (13) arranged on a paper or paperboard web (35). The extruder melts and mixes the polymer. In case of blends the extruder may also be used to blend the polymers which are for example supplied via separate hoppers. The molten film (32) and the paperboard are joined in a nip between rollers (33 and 34) which exert a pressure. One of the rollers can be a chilled roller which reduces the temperature of the polymer when in the nip. Similarly the other polymers of the packaging material may be added to the web of paper or paperboard (35). The barrier layer (14) may for example be arranged from a separate roll and arranged together with the laminate layer (13), or with an adhesive.

Figure 4:
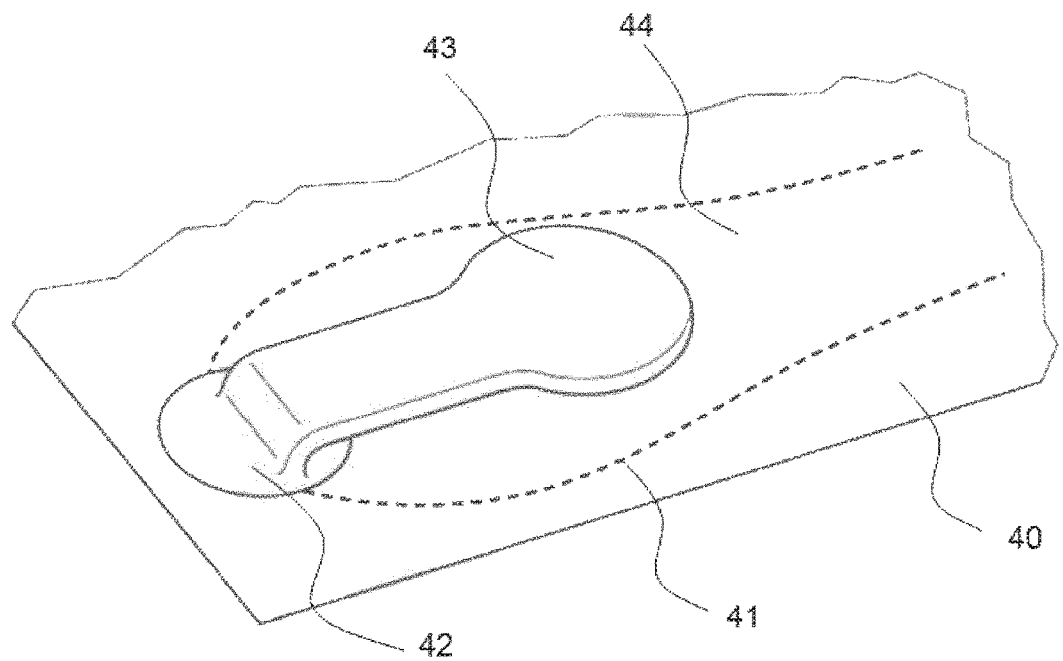
FIG. 4a-4c show embodiments of opening devices disclosed herein.

FIG. 4a is a schematic illustration of an outer part of a packaging container made of a packaging material (40), for example as described in FIG. 1, and the illustration includes a handle for consumer opening, i.e. a tab section (43) which is a plastic tab made by moulding, e.g. injection moulding. The illustration additionally includes an attenuation or hole (42), a weakening(s) and a consumer opening area (44).

Figure 4B:
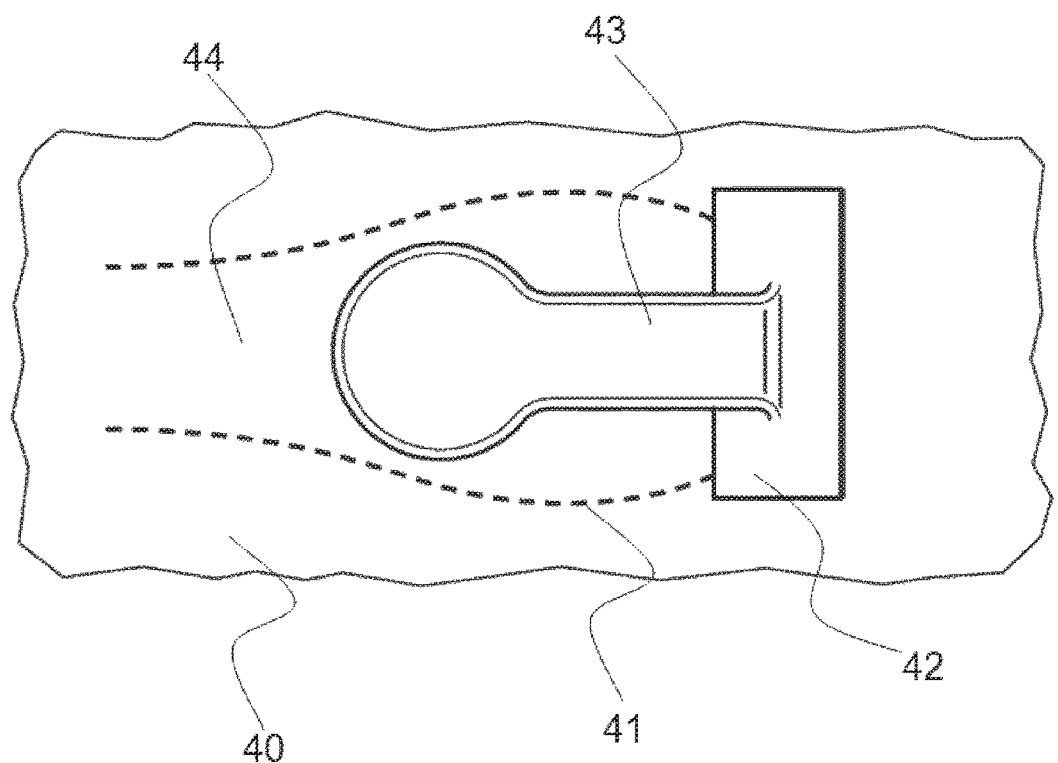

FIG. 4b is a schematic illustration of an outer part of a packaging container made of a packaging material (40), for example as described in FIG. 1, and the illustration includes a handle for consumer opening, i.e. a tab section (43) which is a plastic tab made by moulding, e.g. injection moulding. The illustration additionally includes an attenuation or hole (42), a weakening(s) and a consumer opening area (44). Compared to the embodiments illustrated by FIG. 4a the illustration in FIG. 4b illustrates another design of the attenuation or hole (42).

Figure 4C:
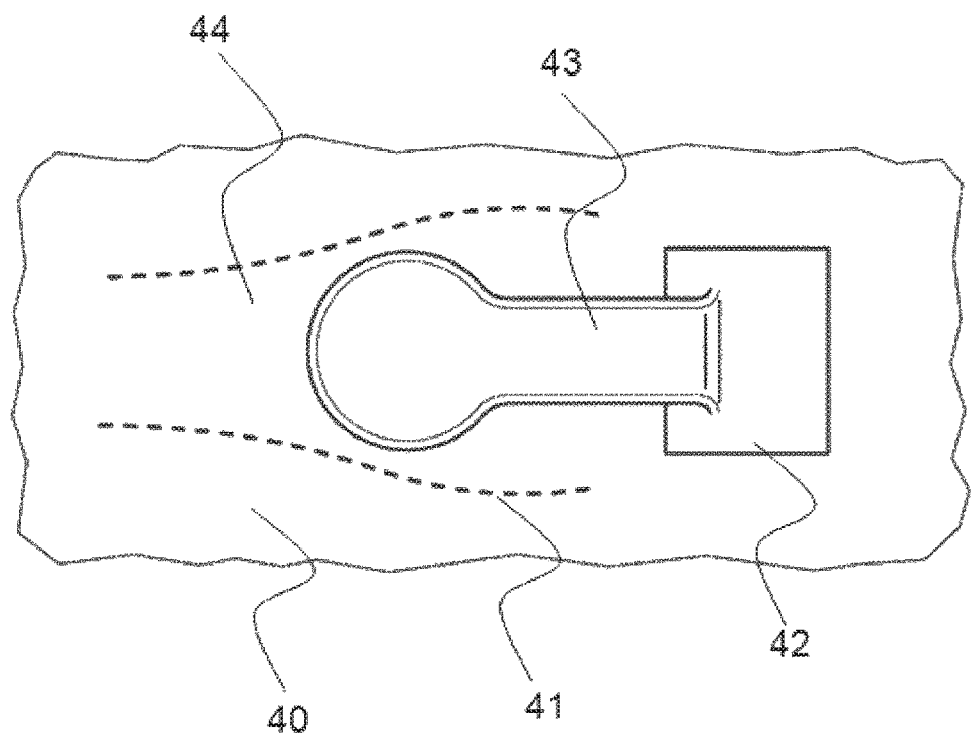

FIG. 4c is a schematic illustration of an outer part of a packaging container made of a packaging material (40), for example as described in FIG. 1, and the illustration includes a handle for consumer opening, i.e. a tab section (43) which is a plastic tab made by moulding, e.g. injection moulding. The illustration additionally includes an attenuation or hole (42), a weakening(s) and a consumer opening area (44). Compared to the embodiments illustrated by FIGS. 4a and 4b the illustration in FIG. 4c illustrates another shape of the attenuation or hole (42). Additionally FIG. 4c illustrates embodiments where the weakening(s) (41) is in indirect contact with the attenuation or hole (42). The attenuation or hole (41) must not be in the shape disclosed in FIG. 4c but may take other forms, e.g. as in FIGS. 4a and 4b. As described herein the embodiments where indirect contact between the attenuation or hole are used are alternatives to those where the weakening(s) is in direct contact with the hole or attenuation. Such embodiments can provide additional consumer and production benefits. For example the tolerances between the weakening and for example the attenuation or hole do not necessarily have to be as good. It is important that whenever a force, e.g. exerted by a consumer onto the tab section (43) and sufficient to cause a rupture in the packaging container, for example in the attenuation or hole (42), propagate the created opening to the weakening(s) (41) which further propagates the opening to define a consumer opening area.

In FIG. 4a-c the attenuation can be covered by plastic or the tab section comes through the attenuation without covering it.

Figure 5:
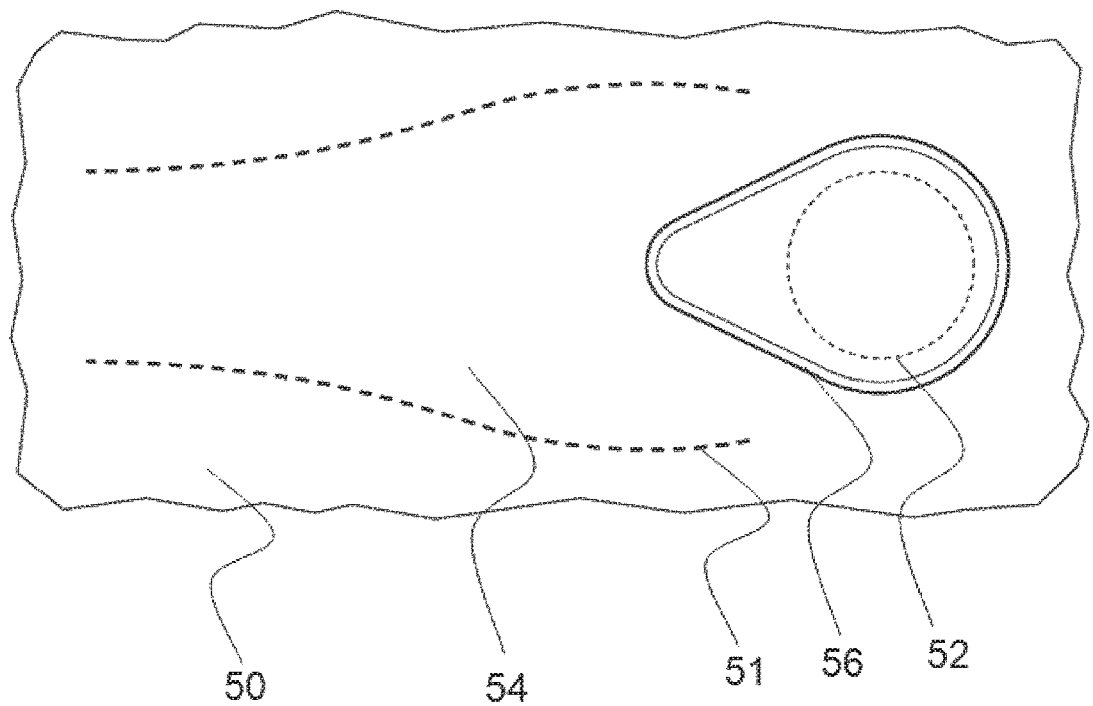
FIG. 5 illustrates a part view of an opening device as described in embodiments herein from the inside of a packaging container.

FIG. 5 is a schematic illustration of an inner part of a packaging container made of a packaging material (50), for example as described in FIG. 1, and the illustration includes an inner part of the opening device (56) which is a plastic part made by moulding, e.g. injection moulding. The illustration additionally shows the attenuation or hole (52) which is hidden behind the plastic part (56) and normally not seen from the inside of the packaging container, a weakening(s) (51) and a consumer opening area (54).

Figure 6:
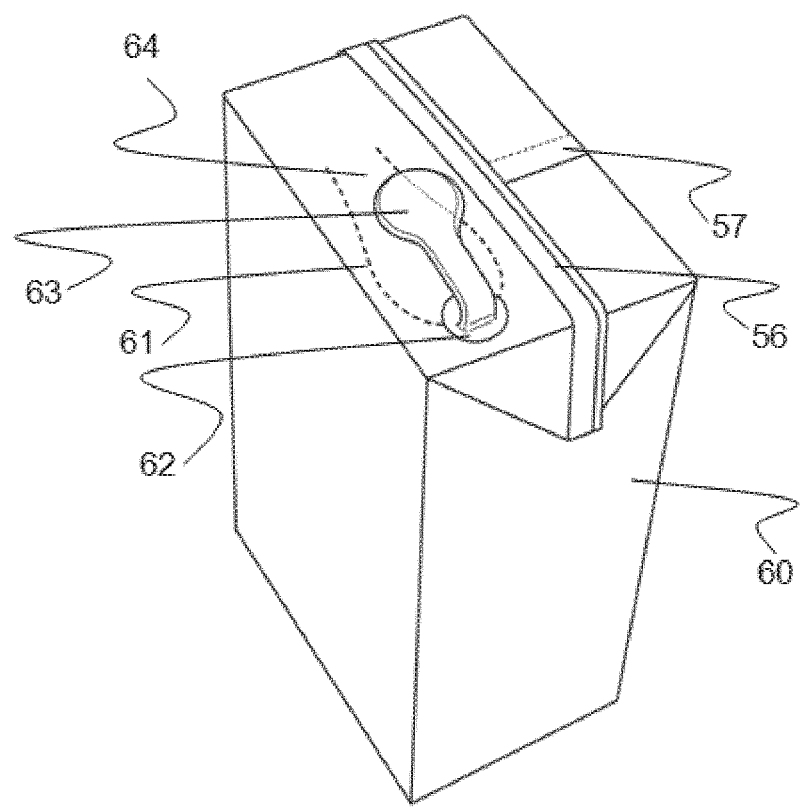
FIG. 6 shows an example of a packaging container produced from the packaging material according to embodiments described herein.

FIG. 6 shows an example of a packaging container 60 produced from the packaging material described in FIG. 1 and which as specified herein has been provided with weakening(s) (61), a consumer opening area 64, and an attenuation (62) on which a tab section (63) is moulded, for example by injection moulding. The tab section is a part of the opening device which as shown in FIG. 5 also has a part on the inside of the packaging container connected via a material bridge. The packaging container is particularly suitable for liquid or semi-liquid food products such as beverages, sauces, soups or the like. Typically, such a package has a volume of about 100 to 2000 ml. It may be of any configuration such as those described herein, but is for example brick-shaped, having longitudinal and transversal seals 56 and 57, respectively, and optionally an opening device 63. In another embodiment, not shown, the packaging container may be shaped as a wedge. In order to obtain such a "wedge-shape", only the bottom part of the package is fold formed such that the transversal heat-seal of the bottom is hidden under the triangular corner flaps, which are folded and sealed against the bottom of the package. The top section transversal seal is left unfolded. In this way the half-folded packaging container is still easy to handle and dimensionally stable (i.e. keeps form and shape) when put on a shelf in the food store or on a table or the like.

Figure 7:
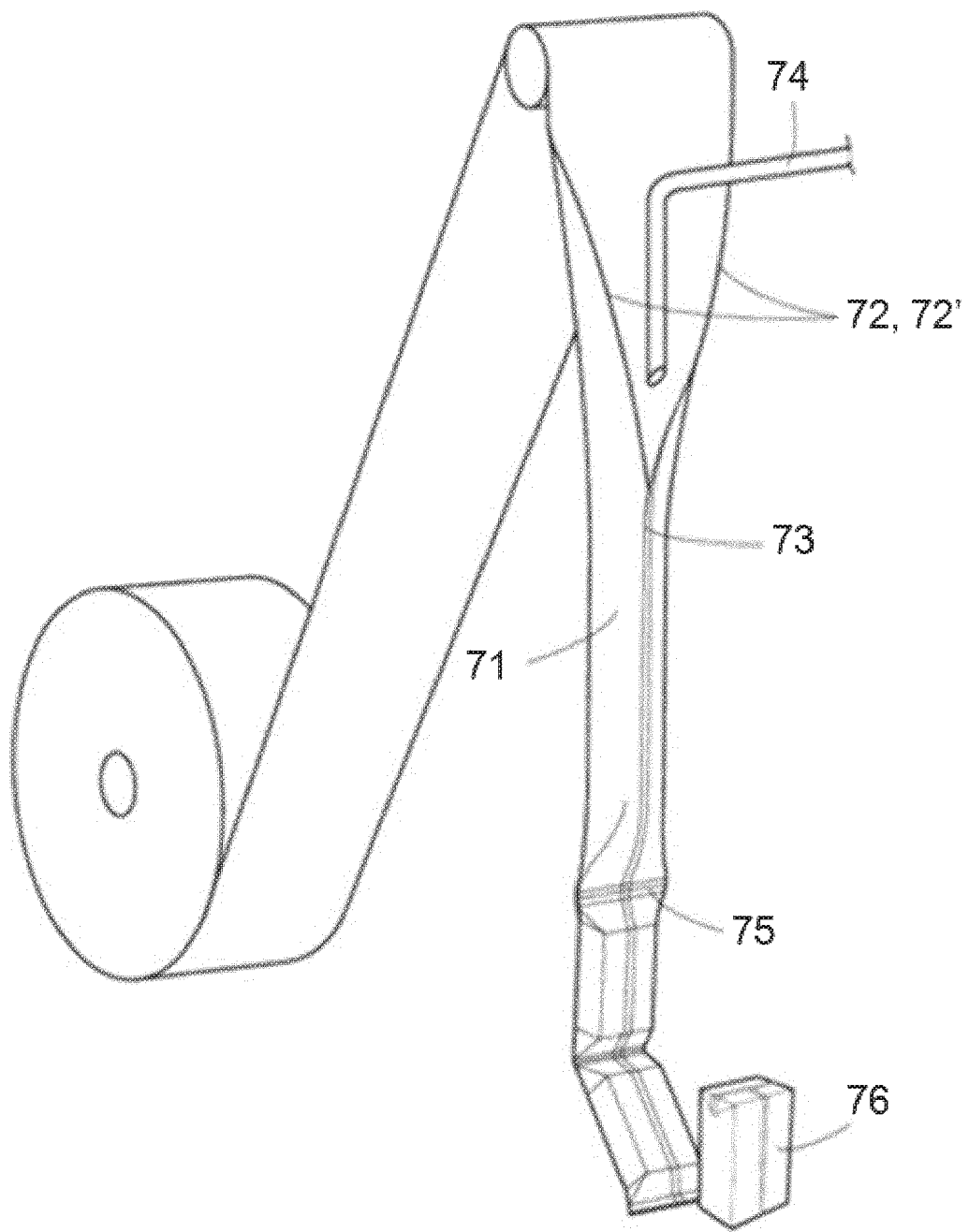
FIG. 7 shows the principle of how such packaging containers are manufactured from the packaging material in a continuous forming, filling and sealing process.

FIG. 7 shows the principle as described in the introduction of the present application, i.e. a web of packaging material is formed into a tube 71 by the longitudinal edges 72, 72' of the web being united to one another in an overlap heat-sealed joint 73. The tube 71 is filled (as illustrated with the filling machine 74) with the intended liquid food product and is divided into individual packages 76 by repeated transversal seals 75 of the tube at a pre-determined distance from one another below the level of the filled contents in the tube exclusively by way of example, and that modifications and alterations obvious to a person skilled in the art are possible without departing from the concept as disclosed in the appended claims.

The invention claimed is:
1. A packaging material for a packaging container for liquid or semi-liquid food, comprising:
a bulk layer comprising paper or paperboard;
a heat-sealing layer;
a barrier layer, the barrier layer arranged between the bulk layer and the heat-sealing layer;

a laminate layer, the laminate layer arranged between the barrier layer and the bulk layer;

wherein the packaging material comprises one or more weakenings in direct or indirect contact with an attenuation in the packaging material, the one or more weakenings defining a consumer opening area, the attenuation configured to provide a material bridge for an injection moulded opening device;

wherein the attenuation comprises the heat-sealing layer, the barrier layer, and the laminate layer; and wherein the attenuation does not comprise the bulk layer.

2. The packaging material according to claim 1, wherein the packaging material additionally comprises a decor layer, wherein the bulk layer is arranged between the decor layer and the laminate layer.

3. The packaging material according to claim 1, wherein an adhesive is arranged between the barrier layer and the heat-sealing layer.

4. The packaging material according to claim 1, wherein the barrier layer is a barrier film or coating of aluminium foil; and/or the decor layer is a thermoplastic polyolefin; and/or the laminate layer is a thermoplastic polyolefin; and/or the heat-sealing layer is a thermoplastic polyolefin.

5. The packaging material according to claim 4, wherein the thermoplastic polyolefin independently is selected from polyethylene and polypropylene.

6. The packaging material according to claim 1, wherein the one or more weakenings comprise:

a first weakening having a first end and a second end, the first weakening extending along the packaging material from the first end to the second end, wherein the second end is proximate to the attenuation; and a second weakening having a first end and a second end, the second weakening extending along the packaging material from the first end to the second end, wherein the second end is proximate to the attenuation;

wherein the first and second weakenings are spaced apart from one another and together define the consumer opening area.

7. The packaging material according to claim 6, wherein the first ends of the first and second weakenings are separated by a first distance, the first distance defining a first end of the consumer opening area, and wherein the second ends of the first and second weakenings are separated by a second distance, the second distance defining a second end of the consumer opening area, and wherein the second end of the consumer opening area is proximate to the attenuation.

8. The packaging material according to claim 6, wherein the first and second weakenings comprise perforations.

9. The packaging material according to claim 6, wherein the first and second weakenings comprise compressions.

10. The packaging material according to claim 6, wherein the first and second weakenings comprise embossing.

11. The packaging material according to claim 1, wherein the attenuation is spaced a distance from one or more sealing bands of the packaging material.

12. The packaging material according to claim 1, wherein the one or more weakenings are in direct contact with the attenuation of the packaging material.

13. The packaging material according to claim 1, wherein the one or more weakenings comprise perforations.

14. The packaging material according to claim 1, wherein the one or more weakenings comprise:

a first weakening having a first end and a second end, the first weakening extending along the packaging material from the first end to the second end, wherein the second end is in direct contact with a perimeter of the attenuation; and a second weakening having a first end and a second end, the second weakening extending along the packaging material from the first end to the second end, wherein the second end is in direct contact with a perimeter of the attenuation;

wherein the first and second weakenings are spaced apart from one another and together define the consumer opening area.

15. The packaging material according to claim 14, wherein the first ends of the first and second weakenings are separated by a first distance, the first distance defining a first end of the consumer opening area, and wherein the second ends of the first and second weakenings are separated by a second distance, the second distance defining a second end of the consumer opening area, and wherein the second end of the consumer opening area is adjacent to the attenuation.

16. The packaging material according to claim 14, wherein the first and second weakenings comprise perforations.

17. The packaging material according to claim 14, wherein the first and second weakenings comprise compressions.

* * * * *

UNITED STATES PATENT AND TRADEMARK OFFICE
CERTIFICATE OF CORRECTION

PATENT NO. : 10,435,220 B2
APPLICATION NO. : 15/109295
DATED : October 8, 2019
INVENTOR(S) : Jonas Bjork et al.

It is certified that error appears in the above-identified patent and that said Letters Patent is hereby corrected as shown below:

On the Title Page

On Page 2, Column 1, Item (57), Line 1, under Abstract, delete "molded" and insert --moulded--.

Signed and Sealed this
Third Day of March, 2020

Andrei Iancu
*Director of the United States Patent and Trademark Office*